US012749143B2

(12) United States Patent
Jin et al.

(10) Patent No.: US 12,749,143 B2
(45) Date of Patent: Sep. 29, 2026

(54) METHOD, APPARATUS, ELECTRONIC DEVICE AND STORAGE MEDIUM FOR MULTI-MODAL DATA PROCESSING

(71) Applicants: Lemon Inc., Grand Cayman (KY); Beijing Zitiao Network Technology Co., Ltd., Beijing (CN)

(72) Inventors: Xiaojie Jin, Los Angeles, CA (US); Bowen Zhang, Beijing (CN); Jiashi Feng, Singapore (SG)

(73) Assignees: LEMON INC., Grand Cayman (KY); BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 321 days.

(21) Appl. No.: 18/406,910

(22) Filed: Jan. 8, 2024

(65) Prior Publication Data

US 2024/0233070 A1 Jul. 11, 2024

(30) Foreign Application Priority Data

Jan. 10, 2023 (CN) ........................ 202310037092.X

(51) Int. Cl.

| | |
|---|---|
| ***G06K 9/00*** | (2022.01) |
| ***G06T 3/40*** | (2006.01) |
| ***G06V 10/77*** | (2022.01) |
| ***G06V 10/82*** | (2022.01) |

(52) U.S. Cl.
CPC ............ *G06T 3/40* (2013.01); *G06V 10/7715* (2022.01); *G06V 10/82* (2022.01)

(58) Field of Classification Search
CPC ...... G06T 3/40; G06V 10/7715; G06V 10/82; G06F 16/7844; G06N 3/08
See application file for complete search history.

(56) References Cited

U.S. PATENT DOCUMENTS

| | | | | |
|---|---|---|---|---|
| 11,023,523 | B2 * | 6/2021 | Hauptmann | G06F 16/738 |
| 12,361,285 | B2 * | 7/2025 | Lewis | G06Q 30/0241 |
| 2024/0233334 | A1 * | 7/2024 | Xia | G06T 5/60 |

FOREIGN PATENT DOCUMENTS

| | | | | | |
|---|---|---|---|---|---|
| CN | 113378989 | A | | 9/2021 | |
| CN | 114398505 | A | * | 4/2022 | G06N 3/044 |
| CN | 115204301 | A | | 10/2022 | |
| CN | 115223086 | A | | 10/2022 | |
| CN | 115238130 | A | * | 10/2022 | G06V 10/80 |

* cited by examiner

*Primary Examiner* — Shervin K Nakhjavan
(74) *Attorney, Agent, or Firm* — Astute IP Law Group

(57) ABSTRACT

Embodiments of the disclosure disclose a method, apparatus, electronic device and storage medium for multi-modal data processing, wherein the method includes: acquiring data of original modality; and processing the data of the original modality by a target processing model to determine data of target modality corresponding to the data of the original modality; wherein the target processing model comprises a multi-modal pre-trained sub-model and a multi-modal feature correction sub-model; a training process of the target processing model comprises training the multi-modal feature correction sub-model with parameters of the multi-modal pre-training sub-model fixed.

18 Claims, 5 Drawing Sheets

METHOD, APPARATUS, ELECTRONIC DEVICE AND STORAGE MEDIUM FOR MULTI-MODAL DATA PROCESSING

CROSS REFERENCE

The present application claims priority to Chinese Patent Application No. 202310037092. X, filed on Jan. 10, 2023 and entitled "Method, apparatus, electronic device and storage medium for multi-modal data processing", the entirety of which is incorporated herein by reference.

FIELD

Embodiments of the present disclosure relate to the field of computer technology, and more particularly to a method, apparatus, electronic device and storage medium for multi-modal data processing.

BACKGROUND

Currently, a large number of researches on multi-modal deep learning have been widely conducted, which is committed to simultaneously process at least two types of modal data in modal data such as speech, text, images, and videos.

In the prior art, a model is often pre-trained based on large-scale and broad multi-modal data, so that the pre-trained model has high understanding ability of multi-modal data in one time. Then, the pre-trained model can be fine-tuned for a series of downstream tasks of multi-modal data processing respectively, in order to transfer the high understanding ability of the pre-trained model to different downstream tasks.

However, the pre-trained model is completely fine-tuned for each downstream task, resulting in low efficiency parameter adjustment. In addition, it is necessary to save a set of model parameters corresponding to each downstream task, which leads to serious storage burden as the number of models increases.

SUMMARY

Embodiments of the present disclosure provide a method, apparatus, electronic device and storage medium for multi-modal data processing, which can improve the efficiency of parameter adjustment and reduce the burden of parameter storage.

In a first aspect, an embodiment of the present disclosure provides a method for multi-modal data processing, comprising:

acquiring data of original modality; and processing the data of the original modality by a target processing model to determine data of target modality corresponding to the data of the original modality;

wherein the target processing model comprises a multi-modal pre-trained sub-model and a multi-modal feature correction sub-model; a training process of the target processing model comprises training the multi-modal feature correction sub-model with parameters of the multi-modal pre-training sub-model fixed.

In a second aspect, an embodiment of the present disclosure further provides an apparatus for multi-modal data processing, comprising:

a data acquiring module configured for acquiring data of original modality; and a data processing module configured for processing the data of the original modality by a target processing model to determine data of target modality corresponding to the data of the original modality;

wherein the target processing model comprises a multi-modal pre-trained sub-model and a multi-modal feature correction sub-model; a training process of the target processing model comprises training the multi-modal feature correction sub-model with parameters of the multi-modal pre-training sub-model fixed.

In a third aspect, an embodiment of the present disclosure further provides an electronic device, comprising:

one or more processors;

a storage device for storing one or more programs, wherein the one or more programs, when executed by the one or more processors, cause the one or more processors implement a method for multi-modal data processing of any of embodiments of the present disclosure.

In a fourth aspect, an embodiment of the present disclosure further provides a storage medium comprising computer-executable instructions which, when executed by a computer processor, are configured to perform a method for multi-modal data processing of any of embodiments of the present disclosure.

The technical solution of the embodiments of the present disclosure includes acquiring data of original modality; and processing the data of the original modality by a target processing model to determine data of target modality corresponding to the data of the original modality; wherein the target processing model comprises a multi-modal pre-trained sub-model and a multi-modal feature correction sub-model; a training process of the target processing model comprises training the multi-modal feature correction sub-model with parameters of the multi-modal pre-training sub-model fixed.

By adding a multi-modal feature correction sub-model, it is possible to complete the training of the corresponding downstream tasks by only training the multi-modal feature correction sub-model while freezing the parameters of the multi-modal pre-trained sub-model, which can improve the efficiency of parameter adjustment. In addition, if it is necessary to save the model parameters corresponding to a plurality of downstream tasks, in the case of saving the parameters of the same set of multi-modal pre-trained sub-model, only the parameters of different multi-modal feature correction sub-models are saved for different downstream tasks, which can reduce the burden of parameter storage.

BRIEF DESCRIPTION OF THE DRAWINGS

In conjunction with the accompanying drawings and with reference to the following detailed description, the above and other features, advantages and aspects of the various embodiments of the present disclosure will become more apparent. Throughout the drawings, like or similar reference numerals denote like or similar elements. It should be understood that the drawings are illustrative and that the original and elements are not necessarily drawn to scale.

DETAILED DESCRIPTION

The embodiments of the present disclosure will be described in more detail below with reference to the accompanying drawings. Although some embodiments of the present disclosure are shown in the accompanying drawings, it should be understood that the present disclosure may be implemented in various forms and should not be construed as being limited to the embodiments described herein, on the contrary, these embodiments are provided for a more thorough and complete understanding of the present disclosure. It should be understood that the accompanying drawings and embodiments of the disclosure are merely illustrative, rather than limiting the scope of protection of the disclosure.

It should be understood that the steps described in the embodiments of the disclosure may be performed according to different orders and/or in parallel. In addition, the embodiments may include additional steps and/or omit the execution of the shown steps. The scope of the disclosure is not limited in this aspect.

The term "comprising" and its variations used herein are open-ended, i.e. "comprising but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in the present disclosure are only used to distinguish different apparatuses, modules, or units, and are not used to limit the order or interdependence of the functions performed by these apparatuses, modules, or units.

It should be noted that the modifications of "one" and "a plurality of" mentioned in the present disclosure are illustrative and not restrictive. Those skilled in the art should understand that unless otherwise specified in the context, they should be understood as "one or more".

It can be understood that the data involved in this technical solution (including but not limited to the data itself, data acquisition or use) should comply with the requirements of corresponding laws, regulations and relevant provisions.

Figure 1:
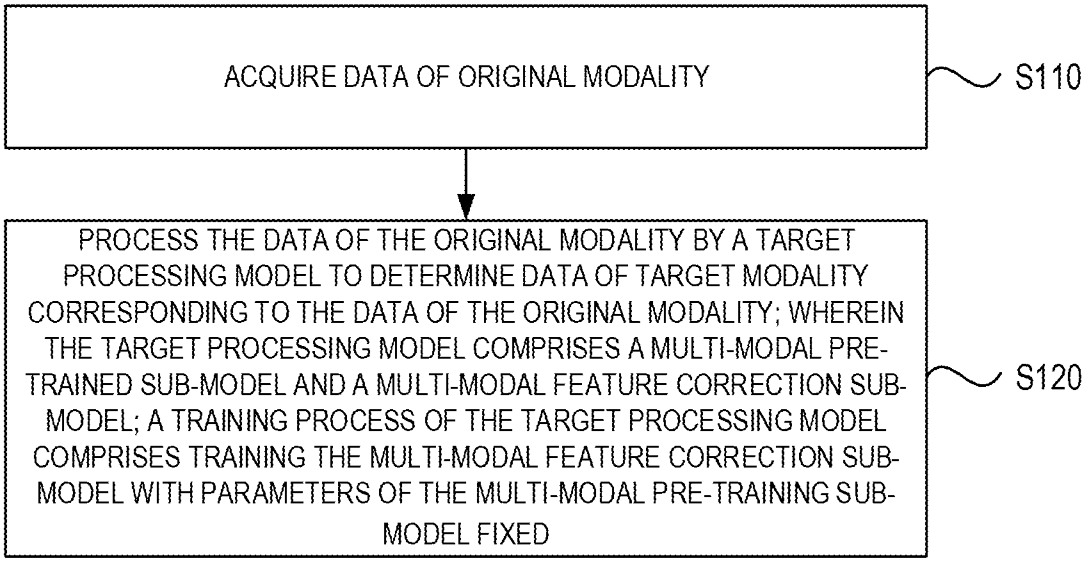
FIG. 1 is a schematic flowchart of a method for multi-modal data processing provided by an embodiment of the present disclosure.

FIG. 1 is a schematic flowchart of a method for multi-modal data processing provided by an embodiment of the present disclosure. Embodiments of the present disclosure are applicable to the situation of multi-modal data processing, such as video and text mutual indexing, mutual generation, etc. The method can be performed by an apparatus for multi-modal data processing, which can be implemented in the form of software and/or hardware, and the apparatus can be configured in an electronic device, such as a computer.

As shown in FIG. 1, method for multi-modal data processing provided by an embodiment of the present disclosure may include:

S110, acquire data of original modality; and

S120, process the data of the original modality by a target processing model to determine data of target modality corresponding to the data of the original modality; wherein the target processing model comprises a multi-modal pre-trained sub-model and a multi-modal feature correction sub-model; a training process of the target processing model comprises training the multi-modal feature correction sub-model with parameters of the multi-modal pre-training sub-model fixed.

In embodiments of the present disclosure, data of original modality and data of target modality generally refer to data of different modalities. The data of different modalities can be considered as data of different data types, such as voice, text, image, video and other modal data. The input data of original modality can be processed by the trained target processing model to determine the data of target modality corresponding to the data of the original modality.

In some alternative implementations, the target processing model is applied to at least one of the following tasks: a video-based text indexing task, a text-based video indexing task, a video-based text generation task, a text-based video generation task, or a video question answering task.

When the target processing model is applied to a video-based text indexing task, the data of original modality may include videos, and the data of target modality may include texts; when the target processing model is applied to a text-based video indexing task, the data of original modality may include texts, and the data of target modality may include videos. In both cases, the processing the data of the original modality by a target processing model to determine data of target modality corresponding to the data of the original modality can include: extracting features of the data of original modality by the target processing model and matching the extracted features with respective features of data of target modality in a predetermined library to retrieve corresponding data of target modality from the predetermined library. The video-based text indexing task includes tasks such as determining the text description of a corresponding classification based on the video, etc.; the text-based video indexing task includes tasks such as searching for related videos based on input keywords, etc.

When the target processing model is applied to a video-based text generation task, the data of original modality may include videos, and the data of target modality may include texts; when the target processing model is applied to a text-based video generation task, the data of original modality may include texts, and the data of target modality may include videos. In both cases, the processing the data of the original modality by a target processing model to determine data of target modality corresponding to the data of the original modal can include: extracting features of the data of original modality by the target processing model and generating the corresponding data of the original modality based on the extracted features. The video-based text generation task includes tasks such as generating text descriptions of video content, etc.; the text-based video generation task includes tasks such as generating related videos based on input keywords, etc.

When the target processing model is applied to the video question answering task, the data of original modality may include videos, and the data of target modality may include texts. At this time, the processing the data of the original modality by a target processing model to determine data of target modality corresponding to the data of the original modality can include: extracting the features of the video and the question text by the target processing model, and generating answer text based on the features of the video and the question text. The video question answering task includes tasks such as understanding video content, etc.

In these alternative implementation, the data of original modality can be one of video and text, and the data of target modality can be another, so that the processing of modal data between video and text can be realized, which helps to intelligently produce and analyze videos. In addition, the target processing model can also handle other video text tasks, as well as tasks between other multi-modal data (such as mutual indexing and generation between audio and texts), which are not exhaustive here.

In an embodiment of the present disclosure, the target processing model can include a multi-modal pre-trained sub-model and a multi-modal feature correction sub-model.

The multi-modal pre-trained sub-model can be regarded as a model pre-trained based on large-scale and broad multi-modal data. The broad multi-modal data can be regarded as the multi-modal data that contains different domains and is not specific to downstream tasks. The multi-modal pre-trained sub-model can include Transformer models, etc. Through large-scale pre-training, the multi-modal pre-trained sub-model can have high understanding ability of multi-modal data in different domains, and extract common features between multi-modal data in different domains. The multi-modal pre-trained sub-model can extract features of corresponding modal data through feature extraction branches of different modalities contained therein.

The multi-modal feature correction sub-model can contain feature correction branches, and the feature correction branches can correspond to the feature extraction branches included in the multi-modal pre-trained sub-model. For example, when the multi-modal pre-trained sub-model includes an audio feature extraction branch, the multi-modal feature correction sub-model includes an audio feature correction branch correspondingly; for another example, when the multi-modal pre-trained sub-model includes a text feature extraction branch, the multi-modal feature correction sub-model includes a text feature correction branch correspondingly, which is not exhaustive here.

After the training of the multi-modal pre-trained sub-model is completed, it can be integrated with the initial multi-modal feature correction sub-model to obtain the initial target processing model. Integrating the multi-modal pre-trained sub-model with the multi-modal feature correction sub-model, for example, can include concatenating the corresponding feature correction branches of the multi-modal feature correction sub-model after the feature extraction branches of respective modalities of the multi-modal pre-trained sub-model; or it can include concatenating feature correction branches after each feature extraction layer in the above respective feature extraction branches.

The initial target processing model can be retrained based on multi-modal sample data of specific downstream tasks, so that the target processing model which completes the training can perform the corresponding downstream tasks. Since the multi-modal feature correction sub-model has the ability to correct the multi-modal features extracted by the multi-modal pre-trained sub-model, during the training process of the target processing model, only the multi-modal feature correction sub-model can be learned and trained with parameters of the multi-modal pre-training sub-model fixed, so that the corrected multi-modal features can be better applied to the corresponding downstream tasks, which achieves transfer learning of high understanding ability of the multi-modal pre-trained sub-model.

The technical solution of an embodiment of the present disclosure includes acquiring data of original modality; and processing the data of the original modality by a target processing model to determine data of target modality corresponding to the data of the original modality; wherein the target processing model comprises a multi-modal pre-trained sub-model and a multi-modal feature correction sub-model; a training process of the target processing model comprises training the multi-modal feature correction sub-model with parameters of the multi-modal pre-training sub-model fixed.

By adding a multi-modal feature correction sub-model, it is possible to complete the training of the corresponding downstream tasks by only training the multi-modal feature correction sub-model while freezing the parameters of the multi-modal pre-trained sub-model, which can improve the efficiency of parameter adjustment. In addition, if it is necessary to save the model parameters corresponding to a plurality of downstream tasks, in the case of saving the parameters of the same set of multi-modal pre-trained sub-model, only the parameters of different multi-modal feature correction sub-model can be saved for different downstream tasks, which can reduce the burden of parameter storage. Therefore, it is beneficial to reduce the deployment cost when deploying models corresponding to a plurality of downstream tasks in a terminal, and can be well extended and utilized in real scenarios.

Embodiments of the present disclosure can be combined with various optional schemes in the method for multi-modal data processing in the above embodiments. In the method for multi-modal data processing provided by the present embodiment, the structure of the target processing model and the training process are described in detail.

Figure 2:
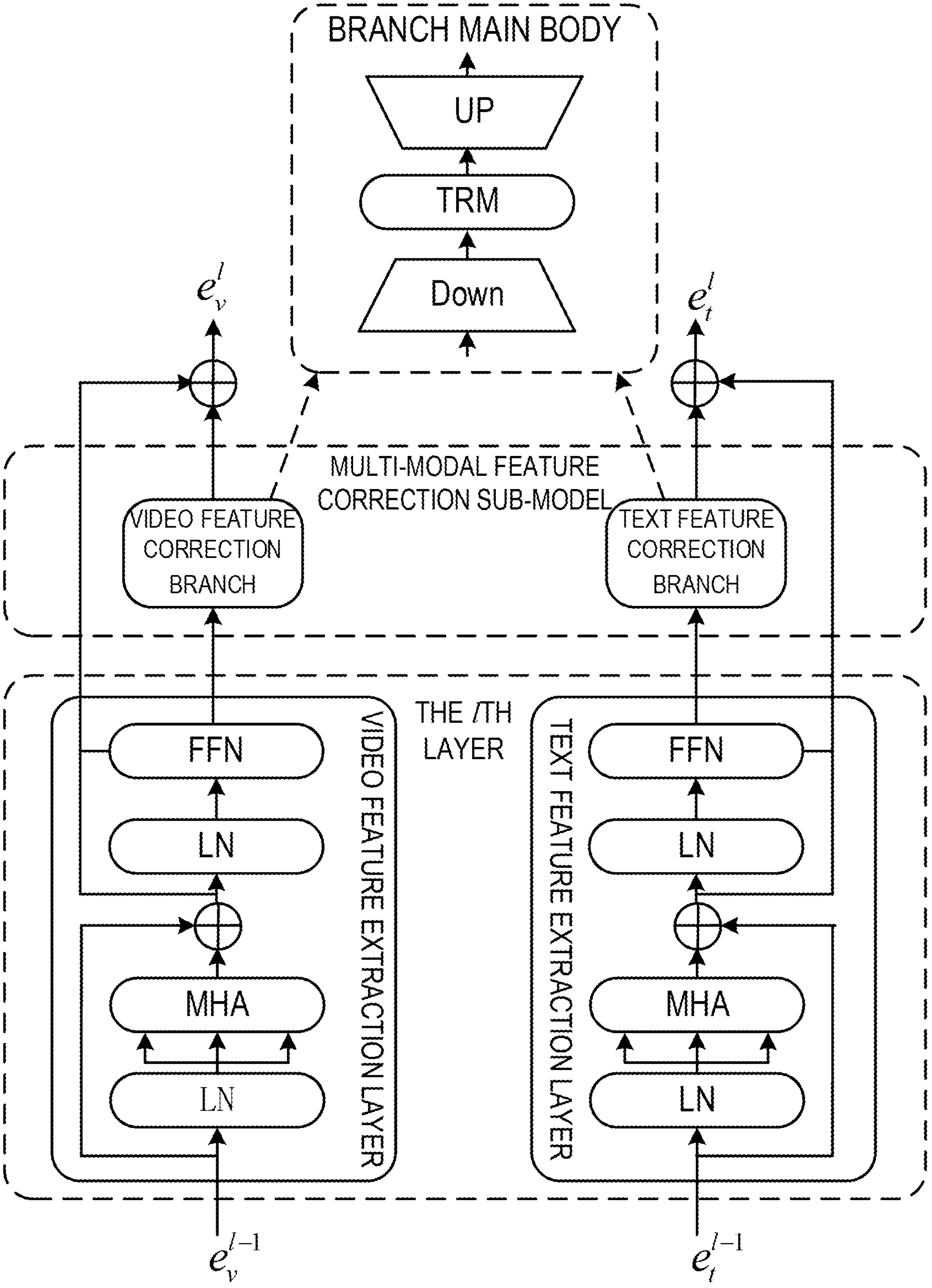
FIG. 2 is a schematic structural diagram of a target processing model in a method for multi-modal data processing provided by an embodiment of the present disclosure.

As an example, FIG. 2 is a schematic structural diagram of a target processing model in a method for multi-modal data processing provided by an embodiment of the present disclosure. Referring to FIG. 2, in some alternative implementations, the multi-modal feature correction sub-model can comprise a video feature correction branch and a text feature correction branch.

In FIG. 2, after passing through the video feature extraction layer and the text feature extraction layer of the lth layer, the video feature $$e_v^{l-1}$$

and the text feature $$e_t^{l-1}$$

corrected by the l−1th layer can be corrected based on the video feature correction branch and the text feature correction branch respectively, to output the video feature $$e_v^l$$

and the text feature $$e_t^l$$

corrected by the lth layer.

The structure of the video feature extraction layer and the text feature extraction layer can be the same or different. For example, in FIG. 2, both can include a layer normalization (LN) layer, a multi-headed attention (MHA) layer, and a residual feed-forward network (FFN) layer and the like, and the connection order between respective layers can be shown in FIG. 2.

The branch bodies of the video feature correction branch and the text feature correction branch can both use the bottleneck structure of the down-sampling layer (represented by Down in FIG. 2), the feature modeling layer (such as the Transformer layer, represented by TRM in FIG. 2), and the up-sampling layer (represented by Up in FIG. 2). By reducing the dimensionality of the video features/text features output by the video feature extraction layer/text feature extraction layer based on the down-sampling layer firstly, and then modeling the features after dimensionality reduction (such as modeling the sequence information of word elements for the text features after dimensionality reduction) based on the feature modeling layer (such as the Transformer model of one layer), then increasing the modeled features to the original dimensions based on the up-sampling layer, and finally adding the features after dimensionality increase with the output of the FFN layer in the video feature extraction layer/text feature extraction layer, the video features/text features can be corrected in a residual manner.

In these alternative implementations, video feature correction branches and text feature correction branches with small parameter quantities and simple bottleneck structures can be used to correct video features and text features, so that the target processing model can complete training for specific downstream tasks while freezing the parameters of the multi-modal pre-training sub-model, which can improve efficiency of parameter adjustment and reduce the burden of parameter storage.

Figure 3:
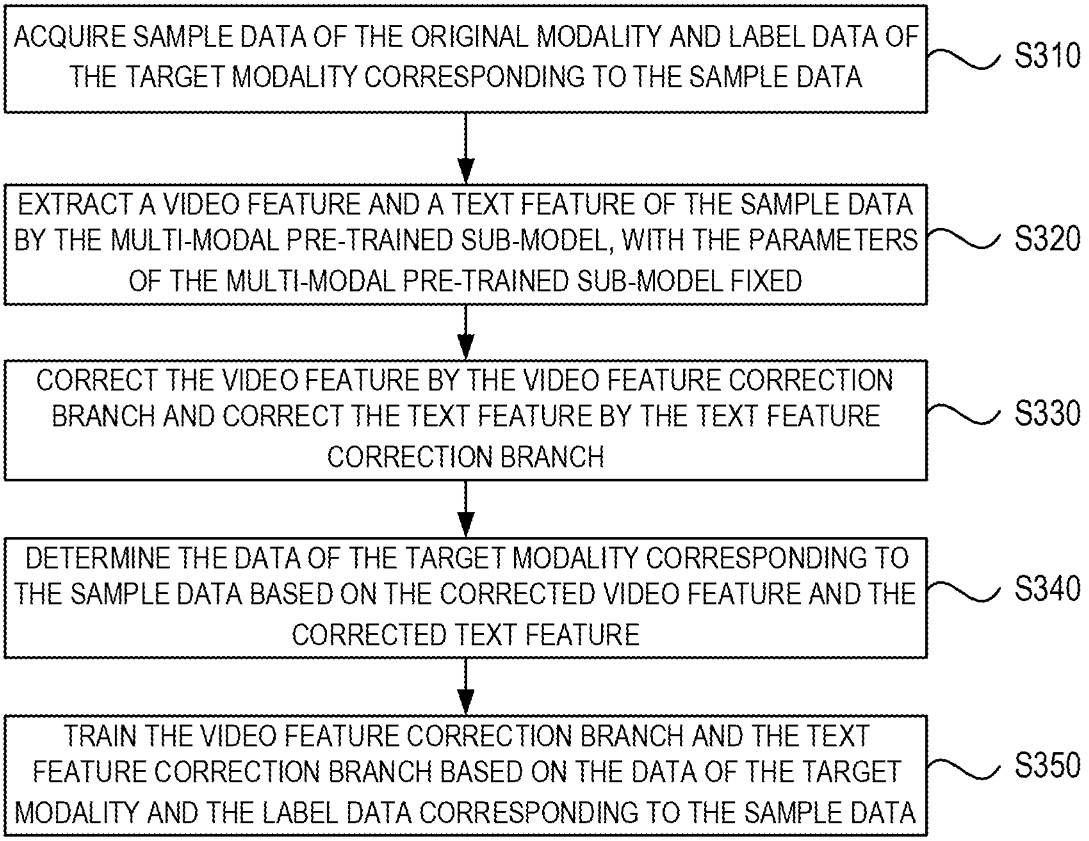
FIG. 3 is a flowchart of training steps of a target processing model in a method for multi-modal data processing provided by an embodiment of the present disclosure.

Correspondingly, FIG. 3 is a flowchart of training steps of a target processing model in a method for multi-modal data processing provided by an embodiment of the present disclosure. Referring to FIG. 3, in these alternative implementations, the training steps of the target processing model may include:

S310, acquire sample data of the original modality and label data of the target modality corresponding to the sample data.

Corresponding sample data and label data can be acquired based on specific downstream tasks so that supervised training can be performed on the target processing model based on the sample data and label data. The sample data of the original modality can include data of the same modality as the data of original modality; the label data of the target modality can include data of the same modality as the data of target modality. In addition, the sample data can also include data of the same modality as the data of target modality. For example, when the target processing model is applied to a video-based text indexing task or a text-based video indexing task, the sample data can include both the video and the text.

S320, extract a video feature and a text feature of the sample data by the multi-modal pre-trained sub-model, with the parameters of the multi-modal pre-trained sub-model fixed.

During the training process of target processing model, the parameters of the multi-modal pre-trained sub-model can be fixed and unchanged. Features of data of the corresponding modality in sample data, such as video features and/or text features of sample data can be extracted based on the feature extraction branches of respective modalities included in the multi-modal pre-trained sub-model.

S330, correct the video feature by the video feature correction branch and correct the text feature by the text feature correction branch.

If the extracted features of the sample data include video features, the video features can be corrected by the video feature correction branch; if the extracted features of the sample data include text features, the text features can be corrected by the text feature correction branch. In addition, the process of the multi-modal feature correction sub-model correcting features can refer to the above process of implementing video feature/text feature correction in a residual manner, which will not be repeated here.

S340, determine the data of the target modality corresponding to the sample data based on the corrected video feature and the corrected text feature.

The target processing model can predict the data of target modality corresponding to the sample data under specific downstream tasks based on the corrected features of multi-modal data.

S350, train the video feature correction branch and the text feature correction branch based on the data of the target modality and the label data corresponding to the sample data.

The loss value can be determined based on the existing loss function, predicted data of target modality and the label data. Afterwards, forward feedback can be performed based on the loss value to adjust the feature correction branch of the corresponding modal feature in the multi-modal feature correction sub-model, thereby completing the training of the video feature correction branch and the text feature correction branch of the multi-modal feature correction sub-model.

The technical solution of embodiments of the present disclosure describes the structure and training process of the target processing model in detail. The multi-modal feature correction sub-model in the target processing model may include a video feature correction branch and a text feature correction branch. The training process of the target processing model may include performing supervised training on the video feature correction branch and the text feature correction branch with a small number of parameters based on sample data and label data corresponding to specific downstream tasks. Therefore, efficient parameter adjustment can be achieved for downstream tasks, and the target processing model can achieve model performance comparable to that of fully adjusting the parameters of the multi-modal pre-trained sub-model without adjusting the parameters of the multi-modal pre-trained sub-model.

Further, the method for multi-modal data processing provided by the embodiment of the present disclosure and the method for multi-modal data processing provided by the above embodiments belong to the same disclosed concept, technical details not described in detail in the present embodiment may refer to the above embodiment, and the same technical features have the same beneficial effects in the present embodiment and the above embodiment.

Various optional schemes in the method for multi-modal data processing provided by the embodiment of the present disclosure and the above embodiment can be combined. In the method for multi-modal data processing provided by the present embodiment, the correction process of video features is described in detail. By modeling the time-sequence information of respective video frames based on the video feature branch and the frame token feature in the video feature, the image block feature in the video feature can be corrected based on the time-sequence information to generate the corrected video feature, which can help to improve the performance of the target processing model in the aspect of video feature time-sequence.

Figure 4:
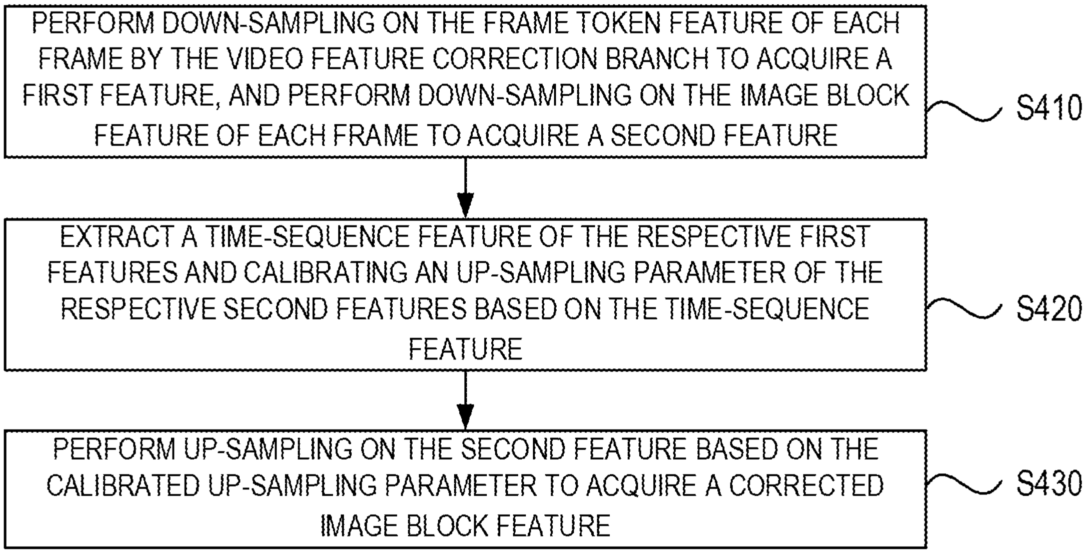
FIG. 4 is a flowchart of correction steps of a video feature in a method for multi-modal data processing provided by an embodiment of the present disclosure.

As an example, FIG. 4 is a flowchart of correction steps of a video feature in a method for multi-modal data processing provided by an embodiment of the present disclosure. Referring to FIG. 4, in some alternative implementations, the video feature comprises a frame token feature and an image block feature of each frame.

It can be understood that during the training process of the target processing model, the video features corresponding to the sample data can be corrected by the video feature correction branch of the multi-modal feature correction sub-model, and/or the text features corresponding to the sample data can be corrected by the text feature correction branch of the multi-modal feature correction sub-model; in the actual application process of the target processing model, the video features corresponding to the data of original modality can be corrected by the trained video feature correction branch, and/or text features corresponding to the data of original modality can be corrected by the trained text feature correction branch.

Regardless of the training process or actual application process of the target processing model, after inputting each frame of the video into the target processing model, each frame image can be divided into respective image blocks (such as non-overlapping image block patch) by its internal multi-modal pre-trained sub-model, and a frame token (such as a classification symbol [CLS] token) corresponding to the frame can be concatenated to the head of respective image blocks of each frame. Correspondingly, the multi-modal pre-trained sub-model extracting the features of each frame can include extracting the frame token features of each frame and the features of respective image blocks to acquire the frame token features and image block features of each frame.

Correspondingly, in these alternative implementations, the correcting the video feature by the video feature correction branch can include:

S410, perform down-sampling on the frame token feature of each frame by the video feature correction branch to acquire a first feature, and perform down-sampling on the image block feature of each frame to acquire a second feature.

Regardless of the training process or the actual application process of the target processing model, after the multi-modal pre-trained sub-model in the target processing model extracts the frame token feature and respective image block features, which can be corrected by the video feature correction branch of the multi-modal feature correction sub-model in the target processing model.

The video feature correction branch can include two sub-branches, which can be referred to frame token sub-branch and image block sub-branch respectively. Correspondingly, respective first features can be acquired by performing down-sampling on the frame token feature of each frame by the down-sampling layer of the frame token sub-branch, and respective second features can be acquired by performing down-sampling on the respective image block features of each frame image by the down-sampling layer of the image block sub-branch.

S420, extract a time-sequence feature of the respective first features and calibrating an up-sampling parameter of the respective second features based on the time-sequence feature.

The time-sequence features can be further extracted based on the feature modelling layer of the frame token sub-branch and first features of respective frames. The feature modeling layer of the frame token sub-branch for example, can be a lightweight Transformer model.

The image block sub-branch can include a feature modeling layer to re-model respective second features of each frame. Then, the up-sampling parameter of the modeled respective second features of the corresponding frame can be timing-calibrated based on the time-sequence features of each frame. However, due to the large number of image blocks, in order to improve the correction efficiency of video features, the image block sub-branch can also not include the feature modeling layer, so that the up-sampling parameter of respective second features of the corresponding frame can be timing-calibrated based on the time-sequence features of each frame. Both of the above methods can achieve the correction of image block features in video features based on time-sequence information.

Calibrating the up-sampling parameter of the second feature based on the time-sequence features of each frame can include: generating calibration coefficients based on the time-sequence features of each frame; calibrating the up-sampling parameter of the second feature of the corresponding frame based on the calibration coefficients. The calibration coefficients are generated based on the time-sequence features of each frame, for example, processing such as normalizing processing, processing based on Multilayer Perceptron (MLP) and the like can be performed on the time-sequence features of each frame to generate the calibration coefficients corresponding to each frame. For example, the calibration coefficients can be processed by multiplying the up-sampling parameters of the second feature of the corresponding frame image, etc. to calibrate respective up-sampling parameters.

S430, perform up-sampling on the second feature based on the calibrated up-sampling parameter to acquire a corrected image block feature.

The calibrated up-sampling parameter may be included in the up-sampling layer in the image block sub-branch, and respective second features may be up-sampled by the up-sampling layer in the image block sub-branch to obtain the corrected image block features of each frame.

Afterwards, the respective corrected image block features of each frame can be concatenated with the frame token features of the corresponding frame as the output of the video feature correction branch. In addition, respective time-sequence features can be up-sampled by the up-sampling layer of the frame token branch to obtain the corrected frame token features of each frame. Then, the respective corrected image block features of each frame can be concatenated with the corrected frame token features of the corresponding frame as the output of the video feature correction branch.

In terms of traditional video feature processing, most existing methods focus on processing features of frame images without utilizing the temporal information of the video. When traditional pre-trained models are applied to specific downstream tasks, they usually use simple methods such as average pooling to aggregate image features with text features, lacking temporal context information, which leads to poor performance of pre-trained models on downstream tasks.

In these alternative implementations of the present embodiment, the video feature correction branch may include a frame token sub-branch for modeling time-sequence information. Down-sampling and the time-sequence feature extraction are performed on the frame token features by the frame token sub-branch, which can enrich the time perception of the frame token features and realize the time-sequence modeling of the video feature; the correction of the image block feature of respective frames is realized by the time-sequence feature to generate the corrected video feature, which helps to improve the performance of the target processing model in terms of time-sequence of the video feature.

In addition, in some further implementations, the extracting a time-sequence feature of the respective first features and calibrating an up-sampling parameter of the respective second features based on the time-sequence feature may include:

firstly, concatenate the respective first features in a temporal order and then concatenate the video token features of the video to acquire the concatenated token feature.

Figure 5:
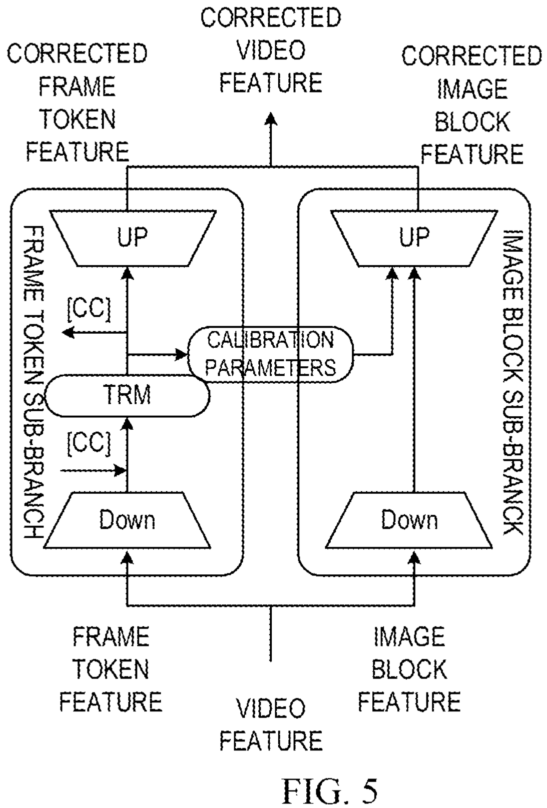
FIG. 5 is a schematic structural diagram of the structure of a video feature correction branch of a multi-modal feature correction sub-model in a method for multi-modal data processing provided by an embodiment of the present disclosure.

As an example, FIG. 5 is a schematic structural diagram of the structure of a video feature correction branch of a multi-modal feature correction sub-model in a method for multi-modal data processing provided by an embodiment of the present disclosure. As shown in FIG. 5, the video feature correction branch may include a frame token sub-branch and an image block sub-branch. The frame token feature input to the frame token sub-branch can be the feature obtained by concatenating the frame token features of respective frames in a temporal order, and its size can be frames×d, wherein frames can represent the total number of images, and d can represent the dimension of the feature (the same character can represent the same content later, which will not be repeated); the respective image block features input to the image block sub-branch can be the feature obtained by concatenating the image block features of respective frames in a temporal order, and its size can be frames×patch×d, wherein patch can represent the number of image blocks divided for each frame.

By down-sampling the frame token features through the down-sampling layer (represented by Down in FIG. 5) of the frame token sub-branch, the first feature concatenated in a temporal order can be obtained, and its size can be frames×d', wherein d' can represent the dimension of feature after dimension reduction. The first feature concatenated in a temporal order can be additionally concatenated with a video token feature (represented by [CC] in FIG. 5, and its size can be 1×d') to obtain the concatenated token feature whose size can be (frames+1)×d'. By down-sampling the features of respective image blocks through the down-sampling layer (represented by Down in FIG. 5) of the image block branch, the second feature concatenated in a temporal order can be obtained, and its size can be frames×patch×d'.

Secondly, extract a time-sequence feature of the concatenated token feature to acquire a third feature.

The time-sequence features of the concatenated token feature are extracted by the feature modeling layer of the frame token sub branch (such as the Transformer layer, represented by TRM in FIG. 5), to acquire the third feature, whose size can be (frames+1)×d'.

Further, analyze the third feature to acquire a fourth feature and respective fifth features, the fourth feature containing global time-sequence information of a video, the respective fifth features containing local time-sequence information.

According to the concatenating manner of respective first features and video token feature, the third feature can be analyzed to acquire the fourth feature containing global time-sequence information of a video (i.e., the video token feature containing global time-sequence information of a video) and respective fifth features containing local time-sequence information (i.e., respective first features containing time-sequence information of each frame).

Finally, determine calibration parameters corresponding to the respective second features based on the fourth feature and the respective fifth features, and calibrate the corresponding up-sampling parameter based on respective calibration parameters.

The fourth feature can be concatenated with the fifth feature corresponding to each frame respectively, and calibration coefficients can be generated based on the concatenated feature, and the up-sampling parameters of the second feature of the corresponding frame can be calibrated based on the calibration coefficients. The specific steps for generating calibration coefficients and calibrating the up-sampling parameter can be referred to the previous description, which will not be repeated here.

Referring to FIG. 5, the video token feature containing global time-sequence information of a video can be removed from the frame token sub-branch, and respective first features containing time-sequence information of each frame can be up-sampled to increase dimensionality by the up-sampling layer of the frame token sub-branch (represented by Up in FIG. 5) to obtain the corrected frame token features. The calibrated up-sampling parameter can be included in the up-sampling layer (represented by Up in FIG. 5) in the image block sub-branch, and respective second features can be up-sampled to increase dimensionality by the up-sampling layer in the image block sub-branch to obtain the corrected respective image block features of each frame. The corrected respective image block features of each frame can be concatenated with the corrected frame token features of the corresponding frame image as the output of the video feature correction branch.

In these further implementations, by concatenating video token features on respective first features, not only the video token feature (i.e., the fourth feature) containing the global time-sequence information of the video can be obtained when modeling the time-sequence features, but also respective first features (i.e., respective fifth features) containing the time-sequence information of each frame can be obtained. Moreover, by concatenating the fourth feature with respective fifth features respectively, the calibration parameters of the corresponding frame image can be determined, and the image block features can be corrected based on global and local time-sequence information, so that the corrected video features can have richer temporal context information, and the target processing model can capture more complex dynamic changes in video and improve the performance of the model in time-sequence.

The technical solution of the present disclosure describes in detail the correction process of video features. By modeling the time-sequence information of respective video frames based on the video feature branch and the frame token feature in the video feature, the image block feature in the video feature can be corrected based on the time-sequence information to generate the corrected video feature, which can help improve the performance of the target processing model in terms of time-sequence of the video feature. In addition, the method for multi-modal data processing provided by the embodiment of the present disclosure belongs to the same disclosed concept as the method for multi-modal data processing provided by the above embodiments. Technical details not described in detail in this embodiment can be found in the above embodiments, and the same technical features have the same beneficial effects in this embodiment and the above embodiments.

Embodiments of the present disclosure can be combined with various alternative schemes in the method for multi-modal data processing provided by the above embodiments. In the method for multi-modal data processing provided by the present disclosure, the structure of the multi-modal feature correction sub-model is supplemented.

In the embodiments of the present disclosure, the multi-modal feature correction sub-model can further comprise a cross-modal interaction branch; wherein an inter-modal shared parameter, which are acquired by the cross-modal interaction branch during a training process of the multi-modal feature correction sub-model, is used for alignment cross features for data of different modalities.

Figure 6:
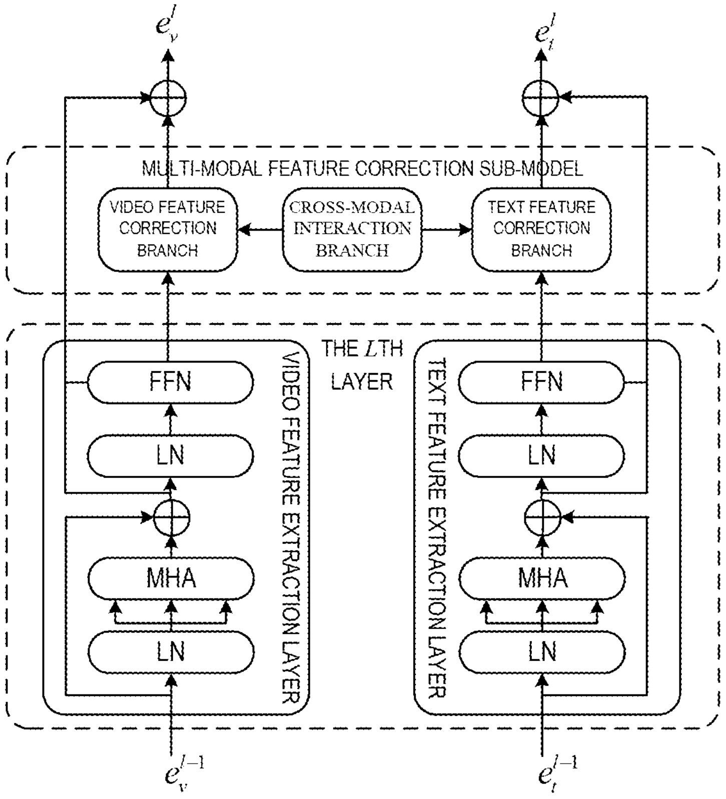
FIG. 6 is a schematic structural diagram of a target processing model in a method for multi-modal data processing provided by an embodiment of the present disclosure.

As an example, FIG. 6 is a schematic structural diagram of a target processing model in a method for multi-modal data processing provided by an embodiment of the present disclosure. It can be considered that the target processing model shown in FIG. 6 adds a cross-modal interaction branch to the structure of the target processing model shown in FIG. 2, and the same structural parts are not repeated here.

Referring to FIG. 6, the cross-modal interaction branch can interact with the video feature correction branch and the text feature correction branch respectively, and the interaction process can include: applying the inter-modal shared parameter in the cross-modal interaction branch to the same steps in the video feature correction and text feature correction processes. The inter-modal shared parameter in the cross-modal interaction branch can be trained and acquired with the training of the multi-modal feature correction sub-model. Applying the inter-modal shared parameter to the same steps in the video feature correction and text feature correction processes may include, for example, respectively applying the inter-modal shared parameter to at least one of the same steps in dimensionality reduction processing of the feature, feature modeling, and dimensionality increase processing of the feature of the video feature and text feature.

In addition, when the feature correction branch of other modal data is included in the multi-modal feature correction sub-model, the cross-modal interaction module can also interact with the feature correction branch of other modal data; correspondingly, the inter-modal shared parameter can also be applied to the feature correction process of other modal data.

In some alternative implementations, the inter-modal shared parameter can comprise a shared down-sampling weight; and wherein the shared down-sampling weight is used to correct down-sampling parameters of the data of different modalities for the alignment cross features for data of different modalities.

Figure 7:
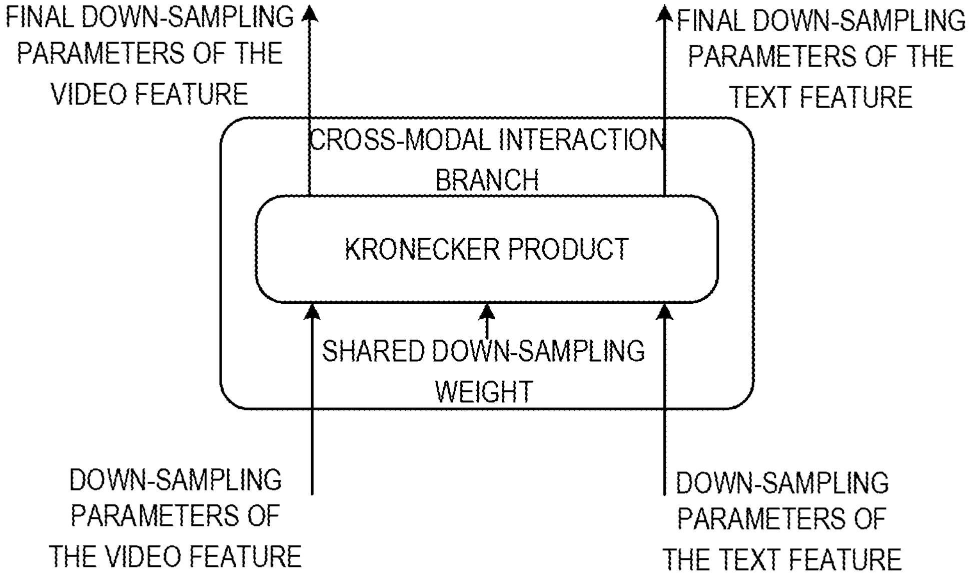
FIG. 7 is a schematic structural diagram of a cross-modal interaction branch of a multi-modal feature correction sub-model in a method for multi-modal data processing provided by an embodiment of the present disclosure.

As an example, FIG. 7 is a schematic structural diagram of a cross-modal interaction branch of a multi-modal feature correction sub-model in a method for multi-modal data processing provided by an embodiment of the present disclosure. Referring to FIG. 7, the down-sampling parameters of the video feature can be maintained in the video feature correction branch, the down-sampling parameters of the text feature can be maintained in the text feature correction branch, and the shared down-sampling weight can be maintained in the cross-modal interaction branch. The down-sampling parameter of the video feature and text feature can be respectively corrected by the shared down-sampling weight in the cross-modal interaction branch. For example, in FIG. 7, the down-sampling parameters of the video feature and text feature can be corrected by calculating the Kronecker product of the shared down-sampling weight, and the down-sampling parameters of the video feature and the down-sampling parameters of the text feature respectively, to obtain the final down-sampling parameters of the video feature and text feature.

In addition, the down-sampling parameters of the video feature and the down-sampling parameters of the text feature can also be corrected based on the shared down-sampling weight in other ways, for example, by calculating the weighted values of the shared down-sampling weight, and the down-sampling parameters of the video feature and the down-sampling parameters of the text feature, etc., which are not exhaustive here. Moreover, when the multi-modal feature correction sub-model includes feature correction branches of other modal data, the down-sampling parameters in the feature correction branches of other modal data can also be corrected based on the shared down-sampling weight.

In these alternative implementations, by correcting the down-sampling parameters in the feature correction branches of data of different modalities based on the shared down-sampling weight, data of different modalities can not only be aligned in the feature space, but also in the parameter space, which helps to calculate the similarity of data between different modalities in downstream tasks.

In some other implementations, the inter-modal shared parameter can also include a shared up-sampling weight and/or a shared feature modeling weight. Correspondingly, the shared up-sampling weight can be used to correct the up-sampling parameters of data of different modalities; the shared feature modeling weight can be used to correct the feature modeling parameters of data of different modalities, thereby further achieving feature alignment between data of different modalities.

The technical solution of the embodiment of the present disclosure supplements the structure of the multi-modal feature correction sub-model. By setting the cross-modal interaction branch in the multi-modal feature correction sub-model, the cross-modal sharing mechanism can be used to implicitly shorten the distance between different modal spaces, so that data of different modalities can be aligned across features, which helps to calculate the similarity of data between different modalities in downstream tasks. Therefore, the performance of the target processing model in downstream tasks can be further improved, and the target processing model can achieve model performance comparable to that of fully adjusting the parameters of the multi-modal pre-trained sub-model.

Further, the method for multi-modal data processing provided by the embodiment of the present disclosure and the method for multi-modal data processing provided by the above embodiments belong to the same disclosed concept, technical details not described in detail in the present embodiment may refer to the above embodiment, and the same technical features have the same beneficial effects in the present embodiment and the above embodiment.

Figure 8:
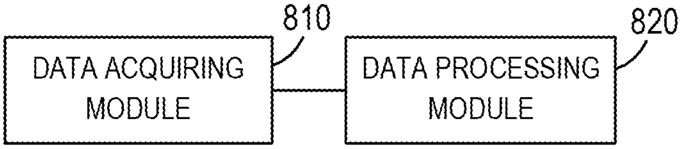
FIG. 8 is a schematic structural diagram of an apparatus for multi-modal data processing provided by an embodiment of the present disclosure.

FIG. 8 is a schematic structural diagram of an apparatus for multi-modal data processing provided by an embodiment of the present disclosure. The apparatus for multi-modal data processing provided by an embodiment of the present disclosure is applicable to the case of multi-modal data processing, such as video and text mutual indexing, mutual generation, etc.

As shown in FIG. 8, the apparatus for multi-modal data processing can include:

a data acquiring module 810 configured for acquiring data of original modality;

a data processing module 820 configured for processing the data of the original modality by a target processing model to determine data of target modality corresponding to the data of the original modality;

wherein the target processing model comprises a multi-modal pre-trained sub-model and a multi-modal feature correction sub-model; a training process of the target processing model comprises training the multi-modal feature correction sub-model with parameters of the multi-modal pre-training sub-model fixed.

In some optional implementations, the multi-modal feature correction sub-model comprises a video feature correction branch and a text feature correction branch;

and the apparatus for multi-modal data processing may further include:

a model Training module configured for training the target processing model based on the following steps:

acquiring sample data of the original modality and label data of the target modality corresponding to the sample data;

extracting a video feature and a text feature of the sample data by the multi-modal pre-trained sub-model, with the parameters of the multi-modal pre-trained sub-model fixed;

correcting the video feature by the video feature correction branch and correcting the text feature by the text feature correction branch;

determining the data of the target modality corresponding to the sample data based on the corrected video feature and the corrected text feature; and training the video feature correction branch and the text feature correction branch based on the data of the target modality and the label data corresponding to the sample data.

In some alternative implementations, the video feature comprises a frame token feature and an image block feature of each frame;

and both the model training module and the data processing module can be configured for:

performing down-sampling on the frame token feature of each frame by the video feature correction branch to acquire a first feature, and performing down-sampling on the image block feature of each frame to acquire a second feature;

extracting a time-sequence feature of the respective first features and calibrating an up-sampling parameter of the respective second features based on the time-sequence feature; and performing up-sampling on the second feature based on the calibrated up-sampling parameter to acquire a corrected image block feature.

In some alternative implementations, the model training module and the data processing module can be configured for:

concatenating the respective first features in a temporal order and then concatenating the video token features of the video to acquire the concatenated token feature;

extracting a time-sequence feature of the concatenated token feature to acquire a third feature;

analyzing the third feature to acquire a fourth feature and respective fifth features, the fourth feature containing global time-sequence information of a video, the respective fifth features containing local time-sequence information;

determining calibration parameters corresponding to the respective second features based on the fourth feature and the respective fifth features, and calibrating the corresponding up-sampling parameter based on respective calibration parameters.

In some alternative implementations, the multi-modal feature correction sub-model further comprises a cross-modal interaction branch;

wherein an inter-modal shared parameter, which are acquired by the cross-modal interaction branch during a training process of the multi-modal feature correction sub-model, is used for alignment cross features for data of different modalities.

In some alternative implementations, the inter-modal shared parameter comprises a shared down-sampling weight; and the shared down-sampling weight is used to correct down-sampling parameters of the data of different modalities for the alignment cross features for data of different modalities.

In some alternative implementations, the target processing model is applied to at least one of the following tasks: a video-based text indexing task, a text-based video indexing task, a video-based text generation task, a text-based video generation task, or a video question answering task.

The apparatus for multi-modal data processing provided by an embodiment of the present disclosure can perform method for multi-modal data processing provided by any embodiment of the present disclosure, and have the corresponding functional modules to perform the method and beneficial effects.

It is worth noting that the various units and modules included in the above apparatus are only divided according to functional logic, but are not limited to the above division, as long as the corresponding functions can be realized; in addition, the specific names of each functional unit are only for ease of distinction from each other, and are not intended to limit the scope of the present disclosure embodiments.

Figure 9:
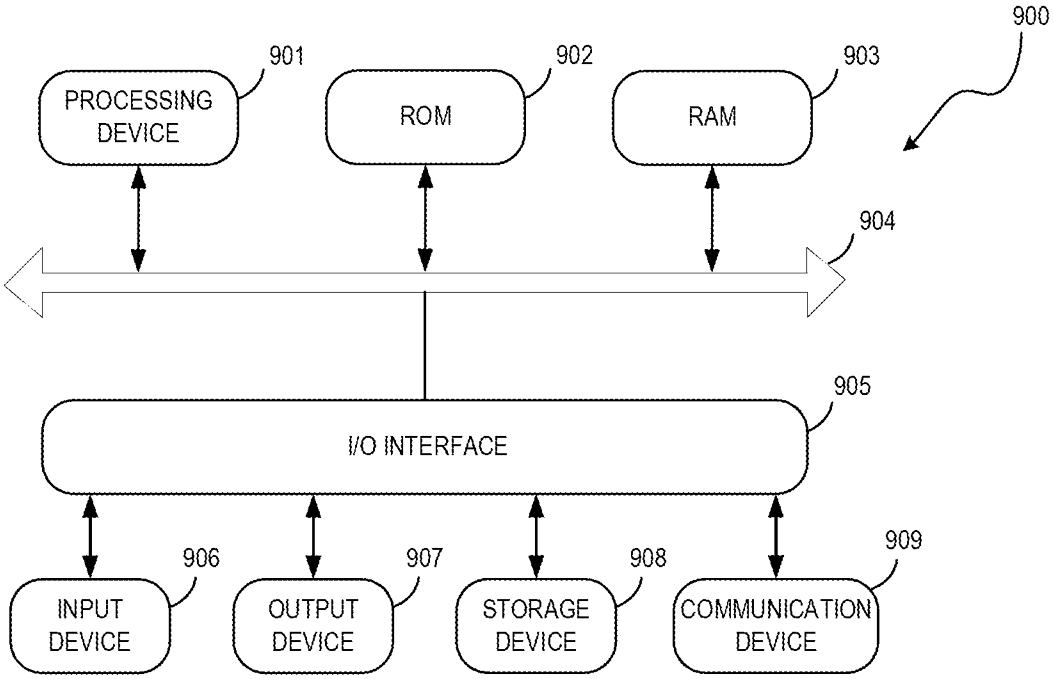
FIG. 9 is a schematic structural diagram of an electronic device provided by an embodiment of the present disclosure.

Now referring to FIG. 9, a structural schematic diagram of electronic device (such as a terminal device or a server in FIG. 9) 900 suitable for implementing an embodiment of the disclosure is shown. The terminal device in the embodiment of the present disclosure can include, but is not limited to, mobile terminals such as a mobile phone, a notebook computer, a digital broadcast receiver, a PDA (personal digital assistant), a PAD (tablet computer), a PMP (portable media player) and a vehicle-mounted terminal (e.g., vehicle-mounted navigation terminal), and fixed terminals such as a digital TV and a desktop computer. The electronic device shown in FIG. 9 is only an example, and should not bring any restrictions on the functions and application scope of the embodiments of the present disclosure.

As shown in FIG. 9, the electronic device 900 may include a processing device (e.g., central processor, graphics processor, etc.) 901 that may perform various appropriate actions and processes based on programs stored in read-only memory (ROM) 902 or loaded into random access memory (RAM) 903 from the storage device 908. Also stored in RAM 903 are various programs and data required for the operation of electronic device 900. The processing device 901, ROM 902, and RAM 903 are connected to each other via bus 904. The input/output (I/O) interface 905 is also connected to the bus 904.

Typically, the following devices can be connected to I/O interface 905: input device 906 including, for example, touch screens, touch pads, keyboards, mice, cameras, microphones, accelerometers, gyroscopes, etc.; output device 907 including, for example, liquid crystal displays (LCDs), speakers, vibrators, etc.; storage device 908 including, for example, magnetic tapes, hard drives, etc.; and communication device 909. The communication device 909 can allow the electronic device 900 to communicate with other devices by wire or wireless to exchange data. Although FIG. 9 shows the electronic device 900 with various devices, it should be understood that it is not required to implement or provide all the devices shown. More or fewer devices may alternatively be implemented or provided.

In particular, according to embodiments of the present disclosure, the process described above with reference to the flowchart may be implemented as a computer software program. For example, embodiments of the present disclosure include a computer program product comprising a computer program carried on a computer readable medium, the computer program comprising program code for performing the method shown in the flowchart. In such an embodiment, the computer program may be downloaded and installed from a network via a communication device 909, or from a storage device 908, or from a ROM 902. When this computer program is executed by the processing device 901, the above-described functions as defined in the method of embodiments of the present disclosure are performed.

The electronic device provided by the embodiment of the present disclosure and the method for multi-modal data processing provided by the above embodiments belong to the same disclosed concept, technical details not described in detail in the present embodiment may refer to the above embodiment, and the same technical features have the same beneficial effects in the present embodiment and the above embodiment.

An embodiment of the present disclosure provides a computer storage medium having stored thereon a computer program which, when executed by a processor implements the method for multi-modal data processing provided by the above embodiments.

It is to be noted that the computer-readable medium described above in this disclosure may be a computer-readable signal medium or a computer-readable storage medium or any combination of the above. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM) or flash memory, optical fiber, portable compact disk read-only memory (CD-ROM), optical storage devices, or any of the above, magnetic memory devices, or any suitable combination of the foregoing. In the present disclosure, a computer-readable storage medium may be any tangible medium that contains or stores a program that may be used by or in combination with an instruction execution system, device, or device. And in the present disclosure, a computer-readable signal medium may include a data signal propagated in the baseband or as part of a carrier wave that carries computer-readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in combination with the instruction execution system, device or device. The program code contained on the computer-readable medium may be transmitted using any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LAN"), wide area networks ("WAN"), internetworks (e.g., the Internet), and end-to-end networks (e.g., ad hoc end-to-end networks), as well as any currently known or future developed networks.

The above computer-readable medium may be contained in the above electronic device; or it may be present separately and not assembled into the electronic device.

The above computer readable medium carries one or more programs which, when executed by the electronic device, cause the electronic device to:

acquire data of original modality; and process the data of the original modality by a target processing model to determine data of target modality corresponding to the data of the original modality; wherein the target processing model comprises a multi-modal pre-trained sub-model and a multi-modal feature correction sub-model; a training process of the target processing model comprises training the multi-modal feature correction sub-model with parameters of the multi-modal pre-training sub-model fixed.

Computer program code for performing the operations of the present disclosure may be written in one or more programming languages or combinations thereof, including object-oriented programming languages—such as Java, Smalltalk, C++, and also including conventional procedural programming languages—such as "C" language or similar programming languages. The program code may be executed entirely on the user's computer, partially on the user's computer, as a stand-alone package, partially on the user's computer and partially on a remote computer, or entirely on a remote computer or server. In the case of a remote computer, the remote computer may be connected to the user computer over any kind of network—including a local area network (LAN) or a wide area network (WAN)—or, alternatively, may be connected to an external computer (e.g., using an Internet service provider to connect over the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in the embodiments of the present disclosure may be implemented by means of software, or by means of hardware. The name of the unit does not in some cases constitute a limitation on the unit itself.

The functions described above herein may be performed, at least in part, by one or more hardware logic components. For example, non-limitingly, example types of hardware logic components that may be used include: field-programmable gate arrays (FPGA), application-specific integrated circuits (ASIC), application-specific standard products (ASSP), systems-on-chip (SOC), complex programmable logic devices (CPLD), and the like.

In the context of the present disclosure, a machine-readable medium may be a tangible medium that may contain or store a program for use by or in conjunction with an instruction execution system, apparatus, or device. The machine-readable medium may be a machine-readable signal medium or a machine-readable storage medium. Machine readable media may include, but are not limited to, electronic, magnetic, optical, electromagnetic, infrared, or semiconductor systems, devices, or equipment, or any suitable combination of the foregoing. More specific examples of machine-readable storage media would include one or more wire-based electrical connections, portable computer disks, hard disks, random access memory (RAM), read-only memory (ROM), erasable programmable read-only memory (EPROM or flash memory), optical fiber, convenient compact disk read-only memory (CD-ROM), optical storage devices, magnetic storage devices, or any suitable combination of the above any suitable combination of the above.

In accordance with one or more embodiments of the present disclosure, Example 1 provides a method for multi-modal data processing, comprising:

acquiring data of original modality; and processing the data of the original modality by a target processing model to determine data of target modality corresponding to the data of the original modality;

wherein the target processing model comprises a multi-modal pre-trained sub-model and a multi-modal feature correction sub-model; a training process of the target processing model comprises training the multi-modal feature correction sub-model with parameters of the multi-modal pre-training sub-model fixed.

In accordance with one or more embodiments of the disclosure, Example 2 provides a method for multi-modal data processing, further comprising:

in some alternative implementations, the multi-modal feature correction sub-model comprises a video feature correction branch and a text feature correction branch;

and training steps of the target processing model comprises:

acquiring sample data of the original modality and label data of the target modality corresponding to the sample data;

extracting a video feature and a text feature of the sample data by the multi-modal pre-trained sub-model, with the parameters of the multi-modal pre-trained sub-model fixed;

correcting the video feature by the video feature correction branch and correcting the text feature by the text feature correction branch;

determining the data of the target modality corresponding to the sample data based on the corrected video feature and the corrected text feature; and training the video feature correction branch and the text feature correction branch based on the data of the target modality and the label data corresponding to the sample data.

In accordance with one or more embodiments of the present disclosure, Example 3 a method for multi-modal data processing, further comprising:

in some alternative implementations, the video feature comprises a frame token feature and an image block feature of each frame;

and the correcting the video feature by the video feature correction branch comprises:

performing down-sampling on the frame token feature of each frame by the video feature correction branch to acquire a first feature, and performing down-sampling on the image block feature of each frame to acquire a second feature;

extracting a time-sequence feature of the respective first features and calibrating an up-sampling parameter of the respective second features based on the time-sequence feature; and performing up-sampling on the second feature based on the calibrated up-sampling parameter to acquire a corrected image block feature.

In accordance with one or more embodiments of the disclosure, Example 4 provides a method for multi-modal data processing, further comprising:

in some alternative implementations, the extracting a time-sequence feature of the respective first features and calibrating an up-sampling parameter of the respective second features based on the time-sequence feature comprises:

concatenating the respective first features in a temporal order and then concatenating the video token features of the video to acquire the concatenated token feature;

extracting a time-sequence feature of the concatenated token feature to acquire a third feature;

analyzing the third feature to acquire a fourth feature and respective fifth features, the fourth feature containing global time-sequence information of a video, the respective fifth features containing local time-sequence information; and determining calibration parameters corresponding to the respective second features based on the fourth feature and the respective fifth features, and calibrating the corresponding up-sampling parameter based on respective calibration parameters.

In accordance with one or more embodiments of the disclosure, Example 5 provides a method for multi-modal data processing, further comprising:

in some alternative implementations, the multi-modal feature correction sub-model further comprises a cross-modal interaction branch;

wherein an inter-modal shared parameter, which are acquired by the cross-modal interaction branch during a training process of the multi-modal feature correction sub-model, is used for alignment cross features for data of different modalities.

In accordance with one or more embodiments of the present disclosure, Example 6 provides a method for multi-modal data processing, further comprising:

in some alternative implementations, the inter-modal shared parameter comprises a shared down-sampling weight; and the shared down-sampling weight is used to correct down-sampling parameters of the data of different modalities for the alignment cross features for data of different modalities.

In accordance with one or more embodiments of the present disclosure, Example 7 provides a method for multi-modal data processing, further comprising:

in some alternative implementations, the target processing model is applied to at least one of the following tasks: a video-based text indexing task, a text-based video indexing task, a video-based text generation task, a text-based video generation task, or a video question answering task.

According to one or more embodiments of the present disclosure, Example 8 provides an apparatus for multi-modal data processing, comprising:

a data acquiring module configured for acquiring data of original modality; and a data processing module configured for processing the data of the original modality by a target processing model to determine data of target modality corresponding to the data of the original modality;

wherein the target processing model comprises a multi-modal pre-trained sub-model and a multi-modal feature correction sub-model; a training process of the target processing model comprises training the multi-modal feature correction sub-model with parameters of the multi-modal pre-training sub-model fixed.

The above description is only a better embodiment of the present disclosure and a description of the technical principles applied. It should be understood by those skilled in the art that the scope of the disclosure covered by the present disclosure is not limited to technical solutions formed by specific combinations of the above technical features, but should also cover other technical solutions formed by any combination of the above technical features or their equivalent features without departing from the above disclosed idea. For example, the above features are interchangeable with (but not limited to) technical features with similar functions disclosed in the present disclosure.

Further, while the operations are depicted in a particular order, this should not be construed as requiring that the operations be performed in the particular order shown or in sequential order. Multitasking and parallel processing may be advantageous in certain environments. Again, while several specific implementation details are included in the above discussion, these should not be construed as limiting the scope of the present disclosure. Certain features described in the context of separate embodiments may also be implemented in combination in a single embodiment. Conversely, the various features described in the context of a single embodiment may also be implemented in multiple embodiments individually or in any suitable sub-combination.

Although the present subject matter has been described using language specific to structural features and/or method logical actions, it should be understood that the subject matter as defined in the appended claims is not necessarily limited to the particular features or actions described above. Rather, the particular features and actions described above are merely example forms of claim fulfillment.

We claim:

1. A method for multi-modal data processing, comprising:

acquiring data of original modality; and processing the data of the original modality by a target processing model to determine data of target modality corresponding to the data of the original modality;

wherein the target processing model comprises a multi-modal pre-trained sub-model and a multi-modal feature correction sub-model, the multi-modal feature correction sub-model comprises a cross-modal interaction branch; an inter-modal shared parameter, which is acquired by the cross-modal interaction branch during a training process of the multi-modal feature correction sub-model, is used for alignment cross features for data of different modalities; a training process of the target processing model comprises training the multi-modal feature correction sub-model with parameters of the multi-modal pre-training sub-model fixed.

2. The method of claim 1, wherein the multi-modal feature correction sub-model further comprises a video feature correction branch and a text feature correction branch;

and wherein training steps of the target processing model comprises:

acquiring sample data of the original modality and label data of the target modality corresponding to the sample data;

extracting a video feature and a text feature of the sample data by the multi-modal pre-trained sub-model, with the parameters of the multi-modal pre-trained sub-model fixed;

correcting the video feature by the video feature correction branch and correcting the text feature by the text feature correction branch;

determining the data of the target modality corresponding to the sample data based on the corrected video feature and the corrected text feature; and training the video feature correction branch and the text feature correction branch based on the data of the target modality and the label data corresponding to the sample data.

3. The method of claim 2, wherein the video feature comprises a frame token feature and an image block feature of each frame;

and wherein the correcting the video feature by the video feature correction branch comprises:

performing down-sampling on the frame token feature of each frame by the video feature correction branch to acquire a first feature, and performing down-sampling on the image block feature of each frame to acquire a second feature;

extracting a time-sequence feature of the respective first features and calibrating an up-sampling parameter of the respective second features based on the time-sequence feature; and performing up-sampling on the second feature based on the calibrated up-sampling parameter to acquire a corrected image block feature.

4. The method of claim 3, wherein the extracting a time-sequence feature of the respective first features and calibrating an up-sampling parameter of the respective second features based on the time-sequence feature comprises:

concatenating the respective first features in a temporal order and then concatenating the video token features of the video to acquire the concatenated token feature;

extracting a time-sequence feature of the concatenated token feature to acquire a third feature;

analyzing the third feature to acquire a fourth feature and respective fifth features, the fourth feature containing global time-sequence information of a video, the respective fifth features containing local time-sequence information; and determining calibration parameters corresponding to the respective second features based on the fourth feature and the respective fifth features, and calibrating the corresponding up-sampling parameter based on respective calibration parameters.

5. The method of claim 3, wherein the video feature correction branch comprises a frame token sub-branch and an image block sub-branch, and the image block sub-branch comprises a feature modeling layer to re-model the respective second features of each frame.

6. The method of claim 1, wherein the inter-modal shared parameter comprises a shared down-sampling weight; and wherein the shared down-sampling weight is used to correct down-sampling parameters of the data of different modalities for the alignment cross features for data of different modalities.

7. The method of claim 1, wherein the target processing model is applied to at least one of the following tasks: a video-based text indexing task, a text-based video indexing task, a video-based text generation task, a text-based video generation task, or a video question answering task.

8. The method of claim 1, wherein the data of original modality comprises any one of the following types of data: voice type, video type, text type, or image type.

9. The method of claim 1, wherein the multi-modal pre-trained sub-model comprises a Transformer model.

10. An electronic device, comprising:

one or more processors;

a storage device for storing one or more programs, wherein the one or more programs, when executed by the one or more processors, cause the one or more processors implement acts comprising:

acquiring data of original modality; and processing the data of the original modality by a target processing model to determine data of target modality corresponding to the data of the original modality;

wherein the target processing model comprises a multi-modal pre-trained sub-model and a multi-modal feature correction sub-model, the multi-modal feature correction sub-model comprises a cross-modal interaction branch; an inter-modal shared parameter, which is acquired by the cross-modal interaction branch during a training process of the multi-modal feature correction sub-model, is used for alignment cross features for data of different modalities; a training process of the target processing model comprises training the multi-modal feature correction sub-model with parameters of the multi-modal pre-training sub-model fixed.

11. The device of claim 10, wherein the multi-modal feature correction sub-model further comprises a video feature correction branch and a text feature correction branch;

and wherein training steps of the target processing model comprises:

acquiring sample data of the original modality and label data of the target modality corresponding to the sample data;

extracting a video feature and a text feature of the sample data by the multi-modal pre-trained sub-model, with the parameters of the multi-modal pre-trained sub-model fixed;

correcting the video feature by the video feature correction branch and correcting the text feature by the text feature correction branch;

determining the data of the target modality corresponding to the sample data based on the corrected video feature and the corrected text feature; and training the video feature correction branch and the text feature correction branch based on the data of the target modality and the label data corresponding to the sample data.

12. The device of claim 11, wherein the video feature comprises a frame token feature and an image block feature of each frame;

and wherein the correcting the video feature by the video feature correction branch comprises:

performing down-sampling on the frame token feature of each frame by the video feature correction branch to acquire a first feature, and performing down-sampling on the image block feature of each frame to acquire a second feature;

extracting a time-sequence feature of the respective first features and calibrating an up-sampling parameter of the respective second features based on the time-sequence feature; and performing up-sampling on the second feature based on the calibrated up-sampling parameter to acquire a corrected image block feature.

13. The device of claim 12, wherein the extracting a time-sequence feature of the respective first features and calibrating an up-sampling parameter of the respective second features based on the time-sequence feature comprises:

concatenating the respective first features in a temporal order and then concatenating the video token features of the video to acquire the concatenated token feature;

extracting a time-sequence feature of the concatenated token feature to acquire a third feature;

analyzing the third feature to acquire a fourth feature and respective fifth features, the fourth feature containing global time-sequence information of a video, the respective fifth features containing local time-sequence information; and determining calibration parameters corresponding to the respective second features based on the fourth feature and the respective fifth features, and calibrating the corresponding up-sampling parameter based on respective calibration parameters.

14. The device of claim 12, wherein the video feature correction branch comprises a frame token sub-branch and an image block sub-branch, and the image block sub-branch comprises a feature modeling layer to re-model the respective second features of each frame.

15. The device of claim 10, wherein the inter-modal shared parameter comprises a shared down-sampling weight; and wherein the shared down-sampling weight is used to correct down-sampling parameters of the data of different modalities for the alignment cross features for data of different modalities.

16. The device of claim 10, wherein the target processing model is applied to at least one of the following tasks: a video-based text indexing task, a text-based video indexing task, a video-based text generation task, a text-based video generation task, or a video question answering task.

17. The device of claim 10, wherein the data of original modality comprises any one of the following types of data: voice type, video type, text type, or image type.

18. A non-transitory storage medium comprising computer-executable instructions which, when executed by a computer processor, are configured to perform acts comprising:

acquiring data of original modality; and processing the data of the original modality by a target processing model to determine data of target modality corresponding to the data of the original modality;

wherein the target processing model comprises a multi-modal pre-trained sub-model and a multi-modal feature correction sub-model, the multi-modal feature correction sub-model comprises a cross-modal interaction branch; an inter-modal shared parameter, which is acquired by the cross-modal interaction branch during a training process of the multi-modal feature correction sub-model, is used for alignment cross features for data of different modalities; a training process of the target processing model comprises training the multi-modal feature correction sub-model with parameters of the multi-modal pre-training sub-model fixed.

* * * * *